UNITED STATES PATENT OFFICE.

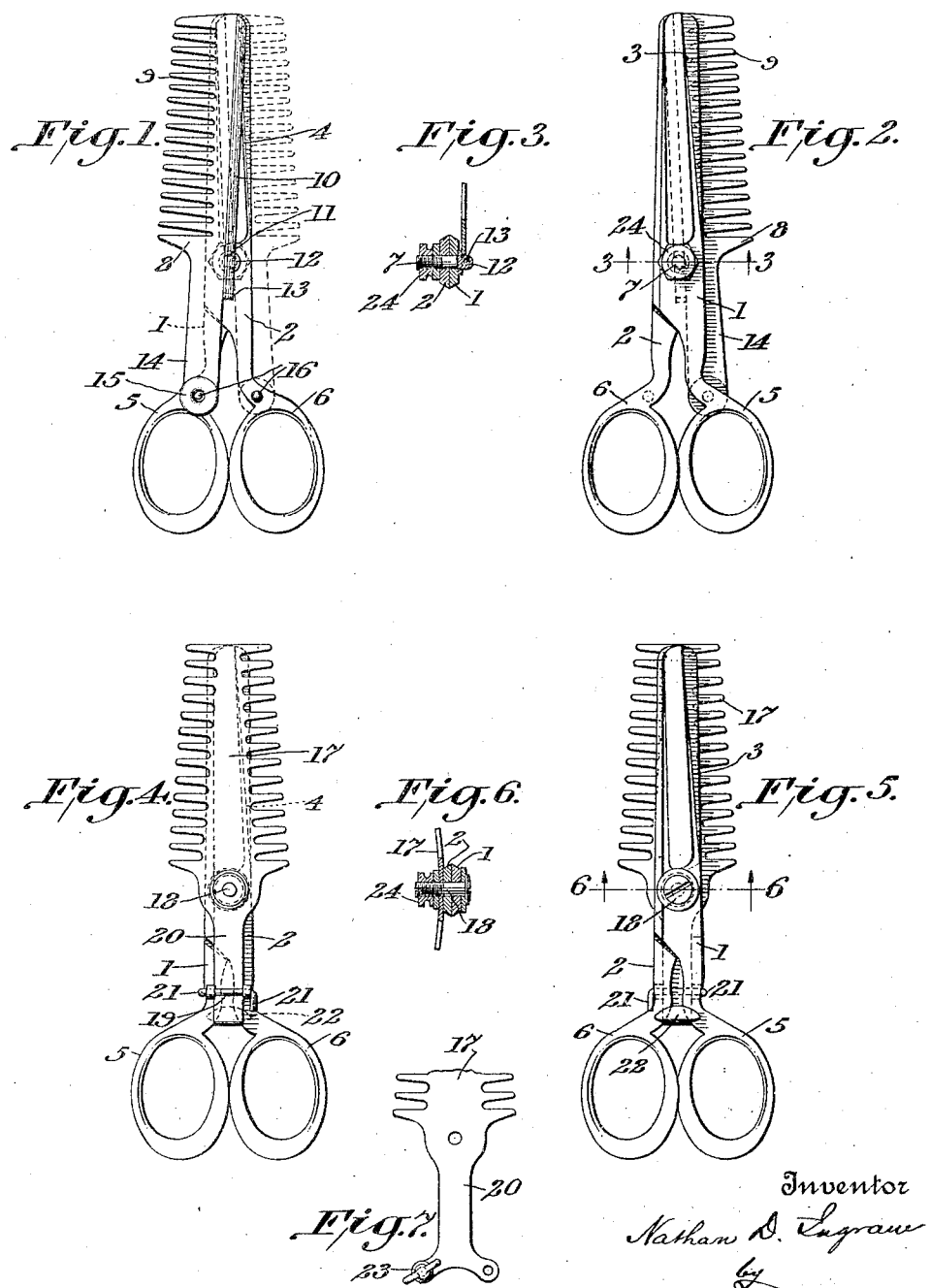

NATHAN D. INGRAM, OF MIAMI, FLORIDA.

HAIR-CUTTING SHEARS.

1,332,296.   Specification of Letters Patent.   Patented Mar. 2, 1920.

Application filed June 23, 1919. Serial No. 306,166.

*To all whom it may concern:*

Be it known that I, NATHAN D. INGRAM, a citizen of the United States, residing at Miami, in the county of Dade and State of Florida, have invented a certain new and useful Improvement in Hair-Cutting Shears, of which the following is a full, clear, and exact description.

The object of this invention is to provide shears or scissors with a comb that may be shifted laterally with relation to the shears into alinement with one blade or the other, so that any person may use the implement either right-handed or left-handed for cutting or trimming one's own hair or beard.

The invention consists of a combined shears or scissors and comb, wherein the comb is so pivoted to the shears or scissors, as by the rivet or pivot which unites the blades thereof, that it may be shifted laterally or transversely with relation to the shears to thereby aline with one blade or the other when the user is cutting on the right-hand side of the head or the left-hand side thereof, so that the usual upward movement of the implement with the comb next to the person's head may be carried on in the ordinary way of cutting or trimming the hair or beard, as I will proceed now to explain and finally claim.

In the accompanying drawings illustrating the invention, in the several figures of which like parts are similarly designated, Figure 1 is a plan view of one embodiment, having the comb pivotally and hingedly applied to the shears or scissors, and also showing the two available positions of the comb in full and dotted lines respectively; Fig. 2 is a plan view of the other side, and Fig. 3 is a cross-section through the pivot joint, taken on line 3—3 of Fig. 2. Fig. 4 is a plan view of an embodiment of the invention in which the comb has teeth on opposite edges and is not hinged to the shears; Fig. 5 is a similar view of the other side, and Fig. 6 is a cross-section on line 6—6 of Fig. 5. Fig. 7 is a plan view of another form of comb fastening.

The shears or scissors may be of any usual or approved style or type, the blades 1 and 2 having the cutting edges 3 and 4, and the handle elements 5 and 6.

Referring to that form of the invention shown in Figs. 1 to 3, the blades have a pivot or rivet member 7 to unite them in operative relation. The comb 8 has the teeth 9 and the back rib 10, and part of this rib is cut away at 11 to receive a hinge knuckle 12 on the pivot. 13 is a pin or pintle which engages the knuckle and the adjacent parts of the rib whereby the comb and the pivot or rivet are pivotally and hingedly connected. The remainder of the rib serves as a reinforce or stiffener for the comb. The comb has an extension 14 provided with a suitable fastening element or elements 15 to engage the complemental fastening element 16 on the handles of the blades. As herein shown, these fastening elements may be the socket and head or stud of the well-known snap fastener largely used on garments.

As shown in Figs. 1 to 3, the comb is fastened to one of the blades and this blade is used to move the comb through the hair as the cutting progresses, the other blade being the active cutting element. When the comb is shifted into alinement with the other blade, as in changing from the right-hand side of the head to the left-hand side, or vice-versa, it is released from its fastening, turned upon its pivot so as to aline it with the other blade and then turned over on its hinged connection with the pivot or rivet and fastened to the other blade, as indicated by dotted lines in Fig. 1. In either position the roots of the comb-teeth are below the cutting edge of the blade to which for the time being the comb is attached, so as to properly present the hair to the cutting blade. This is true also of the implement next described.

In the construction shown in Figs. 4 to 6, the comb 17 has teeth on both edges, and is pivotally mounted upon the pivot or rivet 18 of the shears or scissors, but is not hingedly mounted thereon and need not be because the teeth on opposite edges are present for coöperation with either blade, and to be useful in such connection the comb is shifted transversely so as to be fastened to the handle element of either blade as desired. Any suitable fastening for this purpose may be used, and as shown, such fastening may be a double crank latch 19 hingedly fixed to an extension 20 of the comb and adapted to engage the shank of the handle element of the selected blade. The crank ends 21 of the latch are set quartering, so that when one is engaging the blade the other will be free. In Fig. 4 the latch is shown connected with the left-hand blade for use of the implement in cutting the hair on the left-hand side of the head, and when it is desired to cut the hair on the right-hand side, the latch will be turned to release the left-hand blade and engage the right-hand blade. To hold the comb in fastened position and alined with the blade its extension 20 may have a stop member 22 extending laterally thereof on both sides to engage the shank of the handle element in opposition to the crank-end then engaged.

Instead of the latch the comb may have its extension 20 modified to receive screws 23, as shown in Fig. 7, to engage screwthreaded holes in the handle elements of the shears or scissors to fasten it in shifted position. Such fastening means also may be used in connection with the comb shown in Figs. 1 to 3. In other words, the invention is not limited to any particular form of fastening for fixing the comb in operative relation to either blade of the shears or scissors.

The pivot or rivet may be held in position by any suitable means, such as nuts 24, and washers or check-nuts or both will be employed as needed or desired.

The comb may be made tapering toward the point of the shears or scissors to correspond more or less with the taper of the shears or scissors.

By these implements a person may cut his own hair or beard in a satisfactory way.

Modifications or variations other than those shown or described are permissible within the object and principle of the invention as herein explained and claimed.

What I claim is:—

1. Hair-cutting shears, having a comb pivotally attached thereto and adapted to be shifted transversely to aline with one blade or the other so that the shears may be used either right-handed or left-handed.

2. Hair-cutting shears, having a comb hingedly pivoted thereto and adapted to be shifted transversely to aline with one blade or the other so that the shears may be used either right-handed or left-handed.

3. Hair-cutting shears, having a comb pivotally attached thereto and adapted to be shifted transversely to aline with one blade or the other so that the shears may be used either right-handed or left-handed, and means to fasten the comb to that blade of the shears to which it is shifted and in connection with which it is to be used for the time being.

4. Hair-cutting shears, having a comb pivotally attached thereto and adapted to be shifted transversely to aline with one blade or the other so that the shears may be used either right-handed or left-handed, said comb carrying at one end a temporary fastening element and the blades having a coöperative fastening part.

5. Hair-cutting shears, having a comb pivotally attached thereto and adapted to be shifted transversely to aline with one blade or the other so that the shears may be used either right-handed or left-handed, said comb and each blade having complemental members of a snap fastener for effecting such shifting engagement.

6. Hair-cutting shears, having a blade-connecting pivot, a comb mounted longitudinally upon the shears, and complemental hinge members on the pivot and comb for pivotally and hingedly connecting the comb with the shears, so that the comb may be shifted from one blade to the other and alined therewith.

7. Hair-cutting shears, having a blade connecting pivot, a comb mounted longitudinally upon the shears, and complemental hinge members on the pivot and comb for pivotally and hingedly connecting the comb with the shears, so that the comb may be shifted from one blade to the other and alined therewith, and means to fix the comb in such shifted position.

In testimony whereof I have hereunto set my hand this 23d day of June, A. D. 1919.

NATHAN D. INGRAM.

Witnesses:
LILLIE M. KEELER,
WM. H. FINCKEL.